United States Patent [19]

Shirahata et al.

[11] Patent Number: 4,700,198
[45] Date of Patent: Oct. 13, 1987

[54] PROCESS FOR RECORDING INFORMATION BY IRRADIATION OF, AN DEPOSITION ON, A SUBSTRATE

[75] Inventors: Ryuji Shirahata; Tatsuji Kitamoto; Yoshihiro Arai, all of Kanagawa, Japan

[73] Assignee: Fuji Photo Film Co., Ltd., Kanagawa, Japan

[21] Appl. No.: 795,145

[22] Filed: Nov. 5, 1985

[30] Foreign Application Priority Data

Nov. 5, 1984 [JP] Japan .................................. 59-232791

[51] Int. Cl.$^4$ .......................... G01D 9/00; G01D 9/42; B05D 3/06
[52] U.S. Cl. ...................................... 346/1.1; 346/108; 427/53.1
[58] Field of Search ...................... 346/1.1, 76 L, 108, 346/107 R, 77 E, 110 V; 358/293, 300; 427/53.1, 10

[56] References Cited

U.S. PATENT DOCUMENTS

| | | | |
|---|---|---|---|
| 4,172,171 | 10/1979 | Suzuki | 427/12 |
| 4,557,944 | 12/1985 | Arai | 427/39 |
| 4,588,656 | 5/1986 | Kitamoto | 427/44 |
| 4,626,315 | 12/1986 | Kitamoto | 156/628 |

Primary Examiner—E. A. Goldberg
Assistant Examiner—Mark Reinhart
Attorney, Agent, or Firm—Sughrue, Mion, Zinn, Macpeak & Seas

[57] ABSTRACT

A process for recording an information on a surface of a substrate, which includes steps of irradiating the substrate surface with radiation modulated according to the information to be recorded and subjecting the surface of the substrate to a deposition treatment to form deposited areas and non-deposited areas in correspondence with the non-irradiated areas and the irradiated areas, respectively. By this process, a recording density of from $10^8$ to $10^9$ bit/mm$^2$ can be obtained.

4 Claims, 2 Drawing Figures

PROCESS FOR RECORDING INFORMATION BY IRRADIATION OF, AN DEPOSITION ON, A SUBSTRATE

BACKGROUND OF THE INVENTION

The present invention relates to a process for recording information at high recording density.

Recording media conventionally known and now practically applied include magnetic cores, magnetic bubbles, semiconductor memories, disc records, audio tapes, compact discs, motion picture films, video discs, video tapes, floppy discs and the like.

With the recent increasing demand for high density recording of information, intensive studies have been conducted for practical application of optical discs using calcogenite materials, etc., horizontal or vertical magnetization recording using a magnetic metal film medium in the field of magnetic recording, or magneto-optical discs. These recording media have the respective characteristics but provide a recording density of $10^6$ bit/mm$^2$ at the most. Accordingly, it has been demanded to develop a technique for recording information at an ultra-high density.

SUMMARY OF THE INVENTION

An object of this invention is to provide a process for recording information at a recording density of from $10^8$ to $10^9$ bit/mm$^2$.

The present invention relates to a process for recording information, which comprises irradiating a substrate surface with radiation modulated according to the information to be recorded, and thereafter subjecting the substrate surface to a deposition treatment with a prescribed material to form non-deposited areas and deposited areas in correspondence with the irradiated areas and the non-irradiated areas, respectively.

DETAILED DESCRIPTION OF THE INVENTION

Figure 1A:
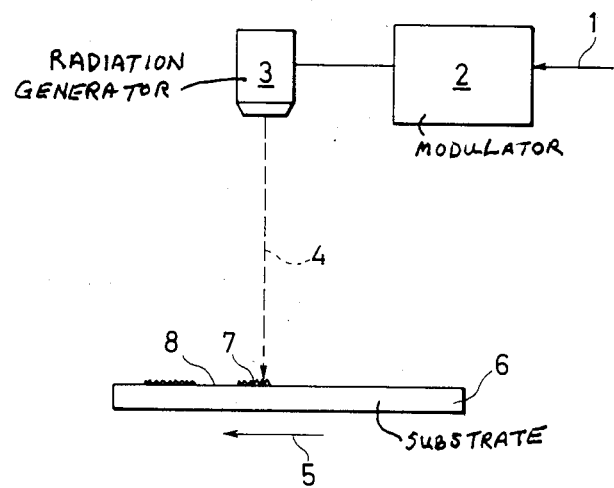
FIGS. 1A and 1B are each a schmematic view illustrating the information recording process in accordance with the present invention.
Figure 1B:
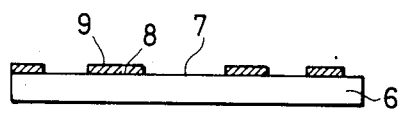

The process of this invention will be described below with reference to FIG. 1. In FIG. 1A, an input signal 1, indicative of information to be recorded, is applied to a radiation generator 3 via a modulator 2. Radiation 4, modulated according to the signal 1 to be recorded, is directed onto the surface of a substrate 6 while the latter is being moved in the direction of an arrow 5, thereby forming an irradiated area 7 and a non-irradiated area 8. The substrate is then subjected to a deposition treatment whereby deposition is not effected in the irradiated area 7. In other words, the signal of an information to be recorded is recorded as a pattern composed of the deposited areas and the non-deposited areas on the substrate surface.

For the purpose of ensuring clear distinction between the deposited area and the non-deposited area to thereby increase an S/N ratio, the substrate may be heated after the deposition treatment, if necessary.

Radiation which can be used in the present invention includes α-rays, β-rays, γ-rays, electron beams, laser beams X-rays, ion particle beams, neutron beams and proton beams. Of these, electron beams are particularly preferred.

The substrate used in the practice of the invention can be selected from among semiconductors such as Si, Ge, GaAs, etc., metals, e.g., Cu, Al, Fe, Ni, Co, Au, Sn, Pb, Mo, W, V, etc., and alloys of these metals; and inorganic materials, e.g., mica, carbon, ceramics, etc.; and organic materials, e.g., polymers, etc.

The readout of the information recorded by the process of this invention can be carried out by various known methods, such as a method of reproducing an information by detecting a pressure difference due to the geometrical form or hardness between a deposited area and a non-deposited area by means of a pressure-electricity transducer; a method of reproducing an information by detecting a capacitance change between a deposited area and a non-deposited area; a method of optically detecting a geometrical unevenness defined by a deposited area and a non-deposited area; and the like. The detection of the geometrical unevenness defined by the deposited area and the nondeposited area can also be obtained by the method described in *Surface Science*, 131, 379–384 (1983).

In the case, when a sufficient resolving power in readout cannot be obtained by the reading methods as described above due to high-density formation of deposited areas and non-deposited areas, method of reproduction by making use of an electron beam may also be employed. Such methods include a reading method making use of a difference in the amount of emitted secondary electrons between a deposited area and a non-deposited area or making use of modulation of secondary electrons; a reading method making use of a difference in the amount of reflective electrons, Auger electrons or X-rays emitted by electron irradiation; and the reading method as described in U.S. Pat. No. 4,101,935 or *IEEE Trans.* Magnetics, MAG-7(3), 684–686 (1971). In addition, a method of reproducing information by detecting a difference in intensity of magnetization between a magnetic deposited area and a non-deposited area by means of a magnetic transducer.

The material to be deposited in the substrate can be selected depending on the method for reading information recorded in accordance with the present invention. For example, in the case of reading out the information by making use of a difference in secondary electron emission efficiency, a material which has a different secondary electron emission efficiency from that of the substrate, e.g., a carbon material for a metal substrate, is employed. When magnetic materials, e.g., Fe, Co, Ni, etc., are used as materials to be deposited, the information on the substrate can be obtained by detecting a leakage flux of the boundary between a deposited area and a non-deposited area. In the case where geometrical unevenness defined by the deposited area and the non-deposited area is made use of for readout, the material to be deposited is not particularly restricted. In the case of making use of a capacitance change between the deposited area and the non-deposited area, electroconductive materials are preferably used as a substrate. Further, when optical reading is worked out, Ag, Al, etc. that have high reflectivity are preferably used as a material to be deposited.

The mechanism which prevents deposition from being effected in the areas where radiation has been applied is not clear, but it is considered that irradiation of electron beams, etc. on the substrate surface may render the irradiated area unstable for the formation of a deposited film. Particularly in the case of using electron beams, a clear distinction between deposited areas and non-deposited areas can be ensured by the presence of an oil in a vacuum pump employed for maintaining the substrate in a vacuum atmosphere. The preferred oils used as the vacuum pump oil are hydrocarbons, such as alkylnaphthalenes, e.g., eicosylnaphthalene, etc.; silicone oils, such as phenylmethyl polysiloxane, pentaphenyltrimethyl trisiloxane, etc.; and ester type oils, such as di-2-ethylhexyl sebacate, di-2-ethylhexyl phthalate, etc.

In addition to the use of the above-described vacuum pump oil, it is also preferable to perform irradiation of electron beams, etc. in a vacuum atmosphere containing a trace amount of an organic gas, e.g., styrene.

According to the present invention, the use of radiation, such as electron beams, makes it possible to record information at an extremely high density. For example, in the case of using an electron beam, the beam diameter can be condensed to about 100 Å so as to realize high-density recording at an areal density of about $10^8$ to $10^9$ bit/mm$^2$.

The present invention will now be illustrated in greater detail with reference to the following examples, but it should be noted that these examples are not limitive of the present invention.

EXAMPLE 1

A 50 μm thick polyethylene terephthalate film having uniformly deposited thereon a copper film of a thickness of 1500 Å was used as a substrate. Electric signals expressed in binary code (0, 1) were modulated into "on" and "off" of an electron beam. The vacuum system for the recording by the electron beam was created by evacuation using a cryopump. The electric signals were recorded on the substrate under the conditions of an accelerating voltage of 25 KV, a beam current of 50 pA and a beam diameter of 50 Å. Thereafter, copper was deposited on the substrate to a thickness of 80 Å, and the substrate heated to 100° C. The resulting recorded medium was examined by one of the aforesaid reproduction methods using secondary electrons. It was found that signals were recorded in correspondence to the input signals at the maximum recording density of $10^5$ bit/mm ($2.54 \times 10^6$ bit/inch).

EXAMPLE 2

An aluminum plate having been subjected to a mirror finish was used as a substrate. Electric signals expressed in binary code (0, 1) were modulated into "on" and "off" of an electron beam. The vacuum system for the recording was created by evacuation using a diffusion pump wherein phenylmethyl polysiloxane was used as a pump oil. The electric signals were recorded on the substrate under conditions of an accelerating voltage of 30 KV, a beam current of 100 pA and a beam diameter of 100 Å. Thereafter, the substrate was deposited with Au to a thickness of 250 Å, followed by heating to 180° C. When the resulting recorded medium was read out in the same manner as in Example 1, signals corresponding to the input signals were reproduced with a track width of 100 Å. It was confirmed that the maximum recording density was $10^5$ bit/mm ($2.54 \times 10^6$ bit/inch), which corresponded to an areal density of $10^9$ bit/mm$^2$.

EXAMPLE 3

A glass plate having been subjected to a mirror finish and cleaning was used as a substrate. Electric signals expressed in binary code (1, 0) were modulated into "on" and "off" of an electron beam. The vacuum system for recording was created by evacuation using a diffusion pump wherein eicosylnaphthalene was used as a pump oil. The electric signals were recorded on the substrate under the conditions of an accelerating voltage of 50 KV, a beam current of 15 pA and a beam diameter of 100 Å. Thereafter, aluminum was deposited in the substrate to a thickness of 150 Å. Reproduction reading of an information was carried out in the same manner as in Example 1. to confirm that signals corresponding to the input signals had been recorded with a track width of 100 Å. Further, the maximum recording density was $10^9$ bit/mm$^2$.

EXAMPLE 4

A stainless steel foil having been subjected to mirror finish was used as a substrate. Electric signals expressed in binary code (1, 0) were modulated into "on" and "off" of an electron beam. The recording was effected in a vacuum system obtained by evacuation using a cryopump while introducing styrene gas into the vacuum system. The electric signals were recorded on the substrate under the conditions of an accelerating voltage of 20 KV, a beam current of 200 pA and a beam diameter of 250 Å. Thereafter, Permalloy was deposited onto the substrate surface to a thickness of 100 Å, and the substrate was heated to 250° C. The substrate was then held in a direct current magnetic field to magnetize Permalloy on the substrate. On reading the thus recorded medium by making use of suitable apparatus, it was confirmed that binary code signals corresponding to the input signals had been recorded with a track width of 100 Å.

EXAMPLE 5

A recorded medium was obtained in the same manner as described in Example 4 but using an argon ion beam having a beam diameter of 2 μm in place of the electron beam. On reading of the recorded signals by the use of a magnetic transducer, it was confirmed that signals corresponding to the input signals had been recorded.

As described above, the process of the present invention wherein a substrate is irradiated with radiation modulated according to an information to be recorded, followed by a deposition treatment to form a deposited area and a non-deposited area is a novel process different from any of the conventional recording processes and makes it possible to record the information at a very high density.

While the invention has been described in detail and with reference to specific embodiments thereof, it will be apparent to one skilled in the art that various changes and modifications can be made therein without departing from the spirit and scope thereof.

We claim:

1. A process for recording information on a surface of a substrate, comprising the steps of: irradiating the surface of the substrate with radiation modulated according to the information to be recorded, and subjecting the substrate surface to deposition of a material to form a pattern of deposited areas and non-deposited areas in correspondence with the non-irradiated areas and the irradiated areas, respectively, without subjecting the substrate to etching, so that said pattern represents said information.

2. The process as claimed in claim 1, further comprising the step of heating said substrate after said step of subjecting said substrate surface to deposition.

3. The process as claimed in claim 1, wherein said radiation comprises electron beams.

4. The process as claimed in claim 3, wherein electron beams are irradiated in a vacuum atmosphere containing a trace amount of an organic gas.

* * * * *